United States Patent

Bohler

[11] Patent Number: 5,951,025
[45] Date of Patent: Sep. 14, 1999

[54] METHOD FOR FIXING A CLAMPING ATTACHMENT ON A WORKPIECE AND DEVICE FOR IMPLEMENTING THE METHOD

[75] Inventor: Erwin Bohler, Bettwiesen, Switzerland

[73] Assignee: Forkardt Spanntechnik AG, Switzerland

[21] Appl. No.: 08/779,824

[22] Filed: Jan. 7, 1997

[30] Foreign Application Priority Data

Jan. 8, 1996 [CH] Switzerland ................... 42/96

[51] Int. Cl.⁶ .............. B23B 5/08; B23B 31/117
[52] U.S. Cl. .............. 279/133; 82/165; 279/143; 451/242; 451/398
[58] Field of Search .................. 279/102, 133, 279/139, 143, 145; 82/165, 166; 451/49, 242, 243, 385, 398

[56] References Cited

U.S. PATENT DOCUMENTS

| | | | |
|---|---|---|---|
| 1,506,035 | 8/1924 | Valtman . | |
| 2,407,908 | 9/1946 | Ventres | 82/166 |
| 2,571,324 | 10/1951 | Young | 451/242 |
| 2,720,807 | 10/1955 | Brown | 82/166 |
| 3,344,695 | 10/1967 | Hohwart | 279/139 |
| 3,858,893 | 1/1975 | Ovabub | 279/17 |

FOREIGN PATENT DOCUMENTS 2175995   10/1973   France .

*Primary Examiner*—Steven C. Bishop
*Attorney, Agent, or Firm*—Olson & Hierl, Ltd.

[57] ABSTRACT

The method uses the actuating mechanism of the chuck of a machine tool for turning or grinding in order to pre-tension the radially acting springs of a clamping attachment by means of the jaws of the chuck. When the pre-tension is released, the springs maintain the clamping attachment on a workpiece that is mounted between centers in order to be machined. The method allows to perform automatic machining cycles on a workpiece mounted between centers, without the necessity to use a compensated chuck.

20 Claims, 2 Drawing Sheets

METHOD FOR FIXING A CLAMPING ATTACHMENT ON A WORKPIECE AND DEVICE FOR IMPLEMENTING THE METHOD

BACKGROUND OF THE INVENTION

In order to maintain an exact centering for precision turning and cylindrical grinding one does not clamp the workpiece in the chuck of the lathe but positions it between centres which determine its rotation axis. Because the friction between the centres and the workpiece is insufficient to rotate the workpiece, the torque needed for machining the workpiece is not transmitted directly from the lathe to the workpiece, but indirectly by means of an attachment mounted on the outer surface of the workpiece and usually fixed by force-locking, e.g. through the action of a radial screw. This attachment comprises simple means which allow a certain amount of eccentricity between the axis of the mechanism that provides the torque necessary for machining and the rotation axis of the workpiece without exerting noticeable radial forces on the workpiece.

Traditional attachments for this purpose usually consist in a simple clamp, sometimes called a "drive dog", fixed to the workpiece by means of one or several radially oriented screws. A finger that rotates with the spindle of the lathe pushes against a stop of the clamping attachment situated at a certain distance from its rotation axis and urges it around, thereby transmitting the rotation of the lathe to the clamping attachment, and hence to the workpiece. Provided the finger can easily glide radially hither and tither on the stop, it will transmit only a torque and practically no radial forces to the workpiece, even when the rotation axis of the attachment does not coincide exactly with that of the spindle. However, this simple device is unsatisfactory for an automated production cycle because of the time required for mounting and dismounting it. Thus, in many applications the clamping attachment has been replaced by a compensating chuck with a floating axis the jaws of which can rotate with an eccentricity of up to a few millimeters with respect to its driving mechanism. The jaws can thus grip the outer surface of a workpiece and drive it even if its surface is not concentric with the rotation axis determined by the centres. But the comparatively large weight of such a chuck generates out of balance forces which must be compensated at high rotation speeds, and this considerably increases the manufacturing costs of compensating chucks. Further, practical considerations make it well-nigh necessary to transmit the relatively large forces needed for gripping the workpiece, or alternatively for pre-tensioning the springs that provide the clamping forces, first axially and then to divert them—either by mechanical or by hydraulic means—into the radial directions required for actuating the jaws of the chuck. This further increases the dimensions, the weight, and the costs of compensating chucks.

Machine tools often comprise a standard chuck with three jaws (with concentric action) and it was hitherto necessary to replace it with a special chuck if the workpiece was to be held between centres. Therefore, it is desirable to devise a torque transmission that exhibits as far as possible the light weight and simplicity of a drive dog attachment, but can nevertheless be used on half or fully automatic machine tools without requiring the complexity of a compensating chuck. To achieve this goal the invention is defined as recited in the claims.

The invention allows one to use a conventional chuck, together with a light and cheap clamping attachment the spring of which can be pre-tensioned either by closing or by opening the chuck. The invention thus provides a simple way to implement an automatic production cycle. In preferred embodiments, the external pre-tensioning forces are aligned with the forces exerted by the springs of the clamping attachment, which makes for an especially compact design and avoids friction losses due to intermediate mechanisms for diverting the pre-tensioning forces in the clamping attachments, or for producing a parallel shift of these forces.

SUMMARY OF THE INVENTION

Hence, it is a general object of the invention to provide a method of fixing by means of at least one spring a clamping attachment on a workpiece in order to transmit a torque from a machine tool to said workpiece, where the at least one spring is pre-tensioned by the chuck of the machine tool.

A further object of the invention is to provide a method of fixing by means of at least one spring a clamping attachment on a workpiece in order to transmit a torque from a machine tool to said workpiece, where the chuck acts directly on the at least one spring in order to pre-tension it before it is mounted on the workpiece, and then to release the pre-tension so as to let the elastic force of the at least one spring immobilize the clamping attachment on said workpiece.

BRIEF DESCRIPTION OF THE DRAWING

The invention will now be illustrated in more detail through a description of a few embodiments, and with reference to the drawing, in which.

DESCRIPTION OF THE PREFERRED EMBODIMENTS

In all representations parts that are in principle necessary but well-known to one skilled in the art, and not essential for the invention itself, were omitted for clarity. Also, the necessary parts were simplified as much as possible.

Further, parts which occur in triplicate on a device divided into three similar 120° sections were attributed only one reference cipher; also the workpiece is always represented in cross-section so as to distinguish it clearly from other parts.

Figure 1:
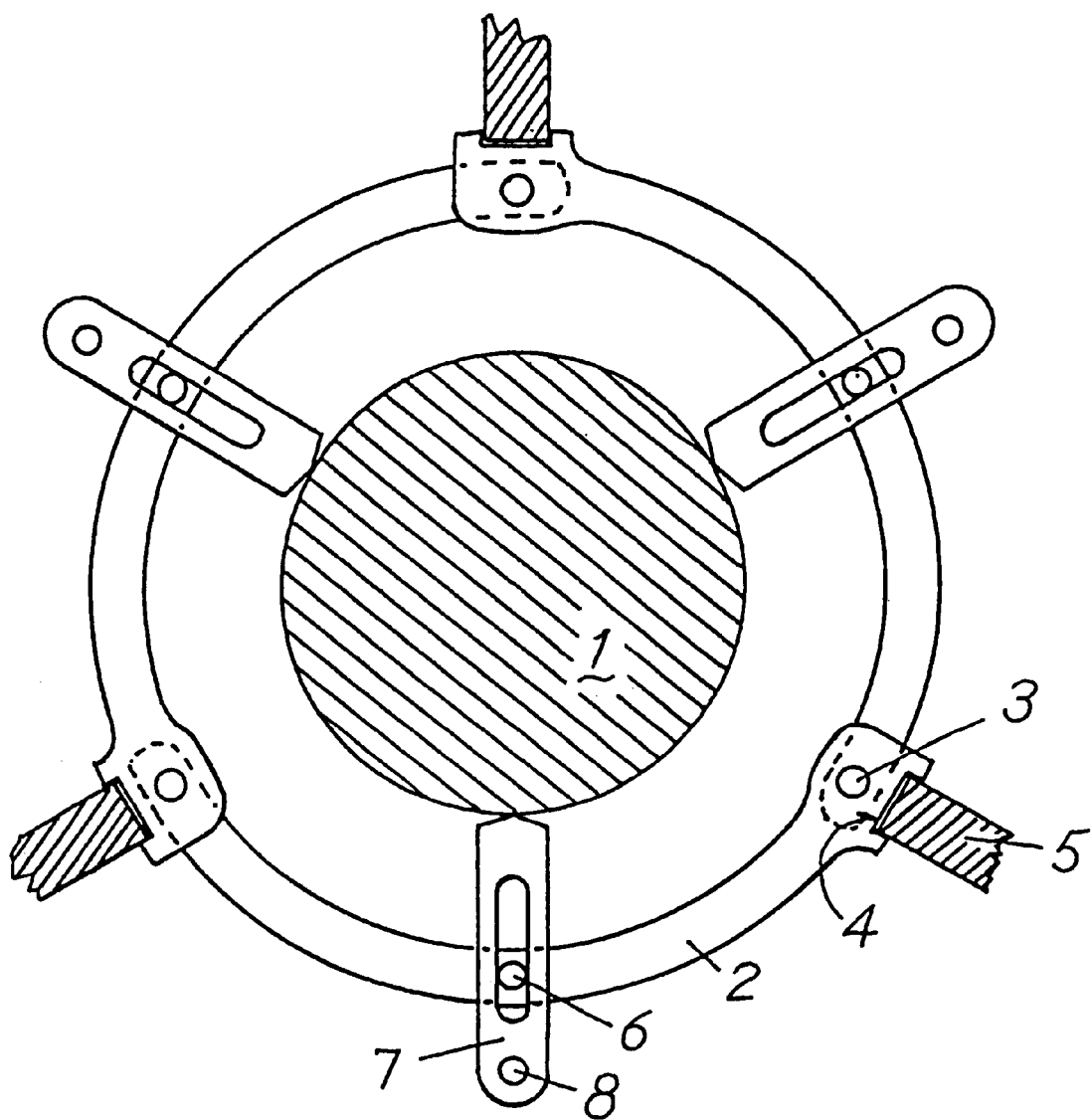
FIG. 1 is a schematic view in axial direction of a simple clamping attachment according to the invention which contacts the workpiece in three points.

In order to illustrate the mechanical principle of the invention FIG. 1 shows a schematic view of a simple embodiment of the new clamping attachment which can be pre-tensioned in two different ways.

In FIG. 1 cipher 1 identifies a cross-section of the workpiece on which the clamping attachment is mounted. The main parts of the attachment are three curved strips 2 made of spring steel and approximately shaped like circle segments with a width in the plane of the drawing that is preferably smaller than their depth normal to that plane. The strips 2 are connected pairwise at their ends through joints 3, the axes of which are normal to the plane of the drawing; together the strips form an approximately circular device. An open seat 4 is provided near one extremity of each strip and on its outer side in order to receive a jaw 5 of the chuck (not shown) of the machine tool. As noted below, the depths and/or widths of these seats may differ. Near the middle of the concave side of each strip there is provided a hole 6 for screwing on a distance piece 7 which has an elongated hole. The distance piece 7 can be adjustably mounted on the strip 2 by means of a screw (not shown) inserted through the elongated hole and the hole 6. The pieces 7 are adjusted in such a way that the clamping attachment only fits on the workpiece when the strips 2 are slightly bent outwards in their middle portions, i.e. when they have a more pronounced curvature than at rest. The size and the adjustment of the distance pieces 7 are chosen so that when no external forces act on the clamping attachment the strips 2 press the distance pieces with sufficient force against the workpiece to transmit without slip the torque necessary for machining. Further means for adjustments may be provided in order to better adapt the clamping attachment to workpieces of various sizes; in particular the joints 3 may comprise eccentric and adjustable axes parallel to the rotation axis of the workpiece.

When no workpiece is mounted, the jaws 5 of the chuck are engaged in the seats 4 and hold the clamping attachment in the desired position. In order to mount the workpiece, one closes the chuck until the inward pressure of its jaws 5 bends the strips sufficiently far outwards against their elastic resistance to make room for the workpiece. Once the latter has been introduced, the chuck is released until the distance pieces 7 maintain the clamping attachment with sufficient force on the workpiece 1 and the jaws 5 are far enough removed from the bottom of each seat 4 to ensure that no noticeable radial force is exerted on the clamping attachment when the chuck rotates, even if the rotation axis of the workpiece (and hence of the clamping attachment) is not exactly in line with the rotation axis of the chuck.

If a high angular precision is required, a special device (not shown) can be provided for transmitting a torque from the chuck to the clamping attachment; this may for instance consist in a finger mounted on the chuck and which engages in a slit provided on the clamping attachment in order to rotate it. However, this function can also be performed by a jaw of the chuck. To determine unambiguously which jaw shall transmit the torque one seat 4 could be made narrower than the other two, so that when a torque is transmitted the corresponding jaw hits a sidewall of its seat before the other jaws. A similar result can be obtained by providing one seat with higher sidewalls than the others, so that its driving jaws will still engage it even when the chuck has been released far enough to remove the other jaws from their respective seats. When the workpiece has been machined, it is released from the clamping attachment by closing the chuck sufficiently to bend the strips 2 far enough against their elastic force to disengage the distance pieces 7 from the workpiece.

Embodiments that work with inwardly directed forces such as those just described will be used when the jaws of the chuck are not suited to exert outwardly directed forces. If, however, the chuck can exert such forces, either through its jaws or through additional jaws specially intended for the purpose, it can be advantageous to pre-bend the strip 2 through the application of radially outwardly directed forces. To this end each distance piece 7 has a hole 8 which can receive a bolt (not shown) screwed either onto the main jaws or onto additional jaws of the chuck. Each bolt co-operates with its associated hole 8 in about the same way as the jaws 5 co-operate with their open seats in the previous embodiment where the chuck exerts only inward pressures, except that here the pre-tensioning is obtained by a radially outward pull instead of by an inwardly directed pressure. A certain clearance, which may for instance be comprised between 0.1 and 2 mm, is provided between each bolt and its hole. If the jaws of the chuck are adjusted accordingly, this play makes it possible to avoid transmitting undesirable radial forces to the workpiece even if the rotation axis of the chuck and that of the workpiece do not coincide exactly. To get an exactly defined angular position of the workpiece when it is being machined, one particular hole 8 may be smaller than the other, which ensures that the torque will always be transmitted through this particular hole and its associated bolt. The hitherto described 120° partition of the full circle corresponds to a preferred embodiment of the invention because of its simplicity and because chucks with three jaws are the norm; depending on the application it can be preferable to use more or fewer springs, and to pre-tension them through intermediate rockers instead of directly applying to the springs a force generated by the movement of the jaws. Further, the springs may be of various types and shapes, and they can be mounted in many different ways. The circular shape shown was essentially chosen for its simplicity, but each spring can also be shaped as a loop or a hairpin. One may also use a single spring shaped as a closed loop, where the three strips 2 are for instance replaced by an integral ring without joints 3, or as described in the next example.

Figure 2:
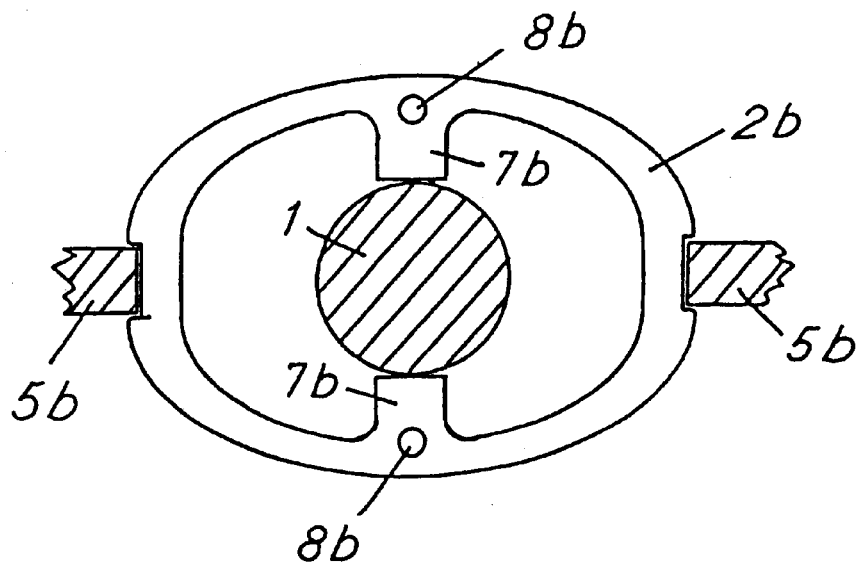
FIG. 2 is a similar and simplified view of a clamping attachment with only two contact points.

FIG. 2 schematically shows the mechanical principle of a clamping attachment according to the invention appropriate for a chuck with two jaws, which comprises only a single elliptical spring 2b. The teeth 7b of this spring correspond to the distance pieces 7 of FIG. 1, but are an integral part of the spring 2b. This simplifies the design of the clamping attachment and reduces its overall size; this solution can be preferable for machining large batches of identical workpieces, even though it allows no individual adjustment. However, the teeth 7b can also consist of exchangeable intermediate blocks. The jaws 5b of the chuck (not shown) with two jaws pre-tensions the spring in a similar way as do the jaws 5 of FIG. 1, except that they exert pressures aligned with the long axis of the elliptical spring. Obviously, an inwardly directed pressure of the jaws 5b on the spring 2b will increase the distance between the teeth 7b of the spring sufficiently to free the workpiece 1. The same result can be obtained through an outward pull exerted on the holes 8b and aligned with the small axis of the ellipse. The transmission of the torque from the machine tool to the clamping attachment, and thereby to the workpiece 1, is obtained in a way similar to that of previous embodiments.

Figure 3:
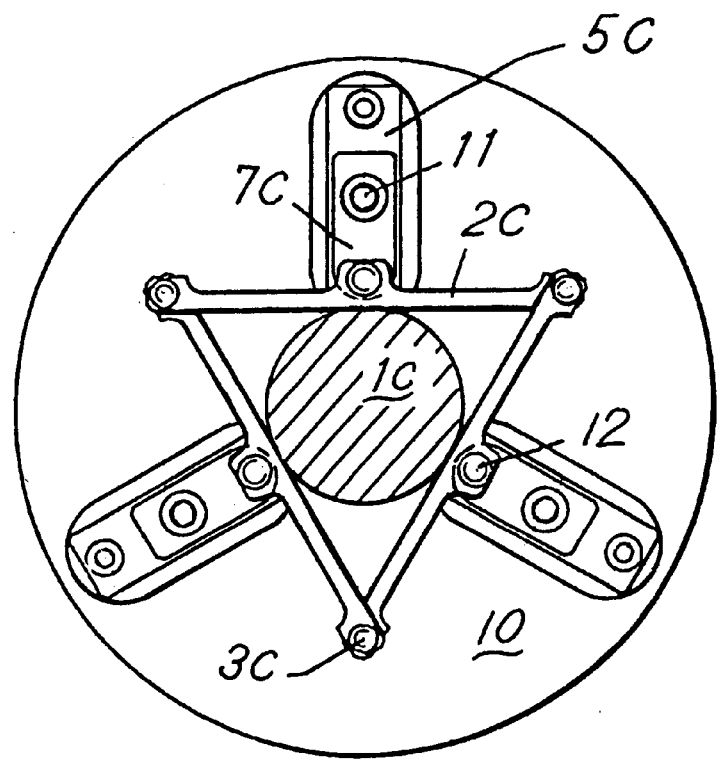
FIG. 3 is a similar view of an embodiment with three contact points designed to be pre-tensioned by an outward pull.

FIG. 3 shows in slightly more detail an axial view of a preferred embodiment of the clamping attachment according to the invention intended for a chuck with a 120° partition and jaws able to exert outwardly directed forces. Parts which have the same function as parts occurring in the previous examples are identified by the same numbers with the letter "c" added; contrary to preceding figures, the front surface of the chuck 10 is shown in FIG. 3. For clarity, parts which occur three times because of the 120° partition are only identified once by a reference cipher. The elastic force needed to grip the workpiece 1 is generated by three essentially straight bars 2c made of spring steel, the ends of which are linked in pairs through bolts 3c. An additional jaw 7c is screwed on each jaw 5c of the chuck 10 by means of a bolt 11. The additional jaw supports a threaded bolt 12 which is engaged in a hole provided in the middle of the corresponding bar 2c, and a certain radial clearance is provided between this hole and the threaded bolt 12, as similarly described in connection with the preceding examples. Here, as in the case of the elliptical spring, the elastic element directly grips the workpiece without intermediate parts like the distance pieces 7 of FIG. 1. An adjustment for workpieces of differing sizes can be provided if one links the ends of the bars through joints with an eccentric adjustment (not shown).

The dimensions of the clamping attachment are chosen so that when the bars are at rest, i.e. straight and not pre-tensioned, the chuck is "active", i.e. not fully open, and that simultaneously the room between the bars is then slightly smaller than the corresponding dimensions of the workpiece on which the clamping attachment must be mounted. If now one opens the chuck further, the threaded bolts 12 will make contact with their respective bars and then bend the centre parts of the bars outwards, for instance by 2.5 mm. This provides enough room to introduce the workpiece and mount it between the centres of the machine tool. The chuck is then activated again until the bars press against the workpiece; in this position the bars should still be slightly bent (e.g. by 2 mm) in order to generate the necessary clamping pressure. The jaws are then moved still further inward until the threaded bolts 12 lie about in the middle of their respective holes, so that the clearance between bolts and holes avoids the transmission of radial force components from the driving chuck to the driven clamping attachment (and thereby to the workpiece), even if the rotation axis of the clamping attachment does not coincide with that of the chuck. The machining can then begin; if needed, one can make sure that the necessary torque is only transmitted through precisely one among the three threaded bolts 12, which can be achieved by allowing this bolt less clearance in tangential direction in its hole than the other threaded bolts in their respective holes. After completion of the machining, the grip of the clamping attachment on the workpiece is released by opening the chuck.

While there are shown and described present preferred embodiments of the invention, it is to be distinctly understood that the invention is not limited thereto, but may be otherwise variously embodied and practised within the scope of the following claims.

I claim:

1. A method for fixing, through the action of at least one pre-tensioned gripping spring, a clamping attachment on a workpiece spanned between centers on a machine tool in order to transmit a torque from the machine tool to the workpiece via the clamping attachment, and for releasing the clamping attachment from the workpiece, characterized in that said at least one gripping spring is pre-tensioned by forces exerted by a non-floating chuck radially fixed relative to the machine tool in order to place the clamping attachment on the workpiece or to remove it therefrom.

2. A method according to claim 1, characterized in that, each of the forces exerted by the chuck is aligned with a force exerted by a spring of the clamping attachment.

3. A method according to one of claims 1 or 2, characterized in that the pre-tensioning forces are transmitted through the opening/closing mechanism of the chuck.

4. A method according to one of claims 1 or 2, characterized in that at least one spring is pre-tensioned by forces exerted by the chuck which are directed radially inwards toward the rotation axis of the workpiece.

5. A method according to one of claims 1 or 2, characterized in that at least one spring is pre-tensioned by forces exerted by the chuck which are directed radially outwards away from the rotation axis of the workpiece.

6. A method according to one of claims 1 or 2, characterized in that the torque is transmitted from the chuck to the clamping attachment with enough radial play to urge the clamping attachment by the chuck without generating radial forces when the rotation axes of these two elements differ to a predetermined extent.

7. A method according to claim 3, characterized that at least one spring is pre-tensioned by forces exerted by the chuck which are directed radially inwards toward the rotation axis of the workpiece.

8. A method according to claim 3, characterized that at least one spring is pre-tensioned by forces exerted by the chuck which are directed radially outwards toward the rotation axis of the workpiece.

9. A method according to claim 3, characterized in that the torque is transmitted from the chuck to the clamping attachment with enough radial play to urge the clamping attachment by the chuck without generating radial forces when the rotation axes of these two elements differ to a predetermined extent.

10. A clamping attachment adapted to be fixed on a workpiece spanned between centers on a machine tool in order to transmit a torque from the machine tool to the workpiece and for releasing the clamping attachment from the workpiece, characterized by at least one spring for fixing the clamping attachment on the workpiece, said spring being shaped so as to generate forces that are mainly oriented radially with respect to the rotation axis of the workpiece when the clamping attachment is in the working position.

11. A clamping attachment according to claim 10, characterized in that the spring is designed so as to be pre-tensioned by outwardly directed radial forces.

12. A clamping attachment according to claim 10, characterized in that the spring is designed so as to be pre-tensioned by inwardly directed radial forces.

13. A clamping attachment according to claim 11, characterized in that said at least one spring is an elastic bar or elastic loop.

14. A clamping attachment according to claim 12, characterized in that said at least one spring is an elastic bar or elastic loop.

15. A clamping attachment adapted to be fixed on a workpiece spanned between centers on a machine tool in order to transmit a torque from the machine tool to the workpiece and for releasing the clamping attachment from the workpiece, at least one spring for fixing the clamping attachment on the workpiece, said spring being shaped so as to generate forces that are mainly oriented radially with respect to the rotation axis of the workpiece when the clamping attachment is in the working position; characterized in that said at least one spring is an elastic bar or elastic loop.

16. A clamping attachment according to claim 15, characterized by several elastic bars or loops linked pairwise by articulations.

17. A clamping attachment according to claim 16, characterized in that the articulations are adjustable through eccentric means, in order to vary the distance between the elastic parts.

18. A clamping attachment according to claim 17, with transmission means for transmitting to the spring the pre-tensioning forces generated by the chuck, characterized in that said transmission means are connectable to a force-transmitting device of the chuck with a radial allowance that is sufficient to transmit essentially only tangential forces to the clamping attachment when the rotation axes of the chuck and of the clamping attachment differ by less than a certain amount, given an aperture of the chuck determined by the diameter of the workpiece.

19. A clamping attachment according to claim 18, characterized in that one of its transmission means is connected with the corresponding transmission element of the chuck with a smaller tangential clearance than all others, such that when the chuck rotates only this particular transmission means transmits a torque to the clamping attachment.

20. A clamping attachment according to claim 19, characterized in that said clamping attachment comprises at least one spring shaped as a closed loop designed to surround a workpiece on which the clamping attachment is mounted.

* * * * *